US011397815B2

(12) United States Patent
Jacquin et al.

(10) Patent No.: US 11,397,815 B2
(45) Date of Patent: Jul. 26, 2022

(54) SECURE DATA PROTECTION

(71) Applicant: HEWLETT PACKARD ENTERPRISE DEVELOPMENT LP, Houston, TX (US)

(72) Inventors: Ludovic Emmanual Paul Noel Jacquin, Bristol (GB); Hamza Attak, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 698 days.

(21) Appl. No.: 16/138,119

(22) Filed: Sep. 21, 2018

(65) Prior Publication Data
US 2020/0097657 A1    Mar. 26, 2020

(51) Int. Cl.
| G06F 21/00 | (2013.01) |
| G06F 21/57 | (2013.01) |
| G06F 21/60 | (2013.01) |
| G06F 11/14 | (2006.01) |
| H04L 9/08 | (2006.01) |
| G06F 8/65 | (2018.01) |
| G06F 21/78 | (2013.01) |

(52) U.S. Cl.
CPC .............. G06F 21/572 (2013.01); G06F 8/65 (2013.01); G06F 11/1433 (2013.01); G06F 21/602 (2013.01); G06F 21/78 (2013.01); H04L 9/0897 (2013.01)

(58) Field of Classification Search
CPC ...... G06F 21/572; G06F 8/65; G06F 11/1433; G06F 21/602; G06F 21/78; G06F 21/575; G06F 8/654; H04L 9/0897
See application file for complete search history.

(56) References Cited

U.S. PATENT DOCUMENTS 7,711,960 B2    5/2010  Scarlata
8,146,150 B2    3/2012  Natu et al.
(Continued)

FOREIGN PATENT DOCUMENTS

| CN | 103154964 A | * | 6/2013 | ............... G06F 8/65 |
| JP | 5023596 B2 | * | 9/2012 | ............... G06F 8/65 |
| WO | WO-2012049757 A1 | * | 4/2012 | ........... G06F 21/572 |

OTHER PUBLICATIONS

NPL Search (InnovationQ) (Year: 2021).*
(Continued)

Primary Examiner — John B King
(74) Attorney, Agent, or Firm — Nolte Lackenbach Siegel

(57) ABSTRACT

A method for secure data protection includes storing secured data, associated with a computer application, using a security co-processor. The secured data is associated with a platform state policy that indicates an expected platform state. The secured data is associated with a version counter policy that indicates an expected version counter. A platform state of a computing platform is stored in the security co-processor. A version counter of the platform state is stored in the security co-processor. A request for the secured data is received from the requester. The platform state is determined to be in a known good state based on the platform state policy, the version counter policy, the platform state, the expected platform state, the version counter, and the expected version counter. The secured data is provided for the requester based on the determination.

20 Claims, 5 Drawing Sheets

(56) References Cited

U.S. PATENT DOCUMENTS

| | | | |
|---|---|---|---|
| 8,839,353 B2 | 9/2014 | Thom et al. | |
| 9,483,662 B2 | 11/2016 | Scarlata | |
| 2004/0117534 A1* | 6/2004 | Parry | G06F 13/24 |
| | | | 710/260 |
| 2008/0163190 A1* | 7/2008 | Shirota | G06F 8/65 |
| | | | 717/170 |
| 2008/0276086 A9* | 11/2008 | Proudler | G06F 21/6218 |
| | | | 713/165 |
| 2010/0229168 A1* | 9/2010 | Maeda | G06F 9/45558 |
| | | | 718/1 |
| 2011/0040961 A1* | 2/2011 | Badaoui-Najjar | G06F 21/57 |
| | | | 713/2 |
| 2011/0066838 A1* | 3/2011 | Takayama | H04L 9/3236 |
| | | | 713/2 |
| 2011/0099362 A1* | 4/2011 | Haga | H04L 9/0897 |
| | | | 380/284 |
| 2011/0099627 A1* | 4/2011 | Proudler | G06F 21/57 |
| | | | 726/21 |
| 2011/0314236 A1* | 12/2011 | Uchida | G06F 8/654 |
| | | | 711/156 |
| 2012/0297175 A1* | 11/2012 | Ekberg | G06F 21/575 |
| | | | 713/1 |
| 2014/0130151 A1* | 5/2014 | Krishnamurthy | G06F 21/572 |
| | | | 726/22 |
| 2014/0137178 A1* | 5/2014 | Thom | G06F 21/6218 |
| | | | 726/1 |
| 2015/0378719 A1* | 12/2015 | Yasutake | G06F 9/00 |
| | | | 717/172 |
| 2016/0371074 A1* | 12/2016 | Vyas | H04W 4/60 |
| 2017/0010881 A1* | 1/2017 | Kawazu | G06F 8/65 |
| 2017/0177873 A1* | 6/2017 | Raghuram | G06F 21/575 |
| 2017/0230179 A1 | 8/2017 | Mannan et al. | |
| 2018/0004502 A1* | 1/2018 | Samuel | G06F 8/71 |
| 2018/0144135 A1* | 5/2018 | Rihan | H04L 63/1458 |
| 2019/0026471 A1* | 1/2019 | Crowley | G06F 21/575 |
| 2019/0095623 A1* | 3/2019 | Narasimhan | G06F 21/44 |
| 2019/0197241 A1* | 6/2019 | Martinez | G08G 5/006 |
| 2020/0012488 A1* | 1/2020 | Koval | G06F 8/71 |
| 2020/0034541 A1* | 1/2020 | Ballard | G06F 8/65 |

OTHER PUBLICATIONS

Fuchs et al., Advanced Remote Firmware Upgrades Using TPM 2.0 (Year: 2016).*

Lee et al., Return of Version Downgrade Attack in the Era of TLS 1.3 (Year: 2020).*

Chen et al., Downgrade Attack on Trustzone (Year: 2017).*

Bhargavan et al., Downgrade Resilience in Key-Exchange Protocols (Year: 2016).*

Richardson et al., UEFI Secure Boot in Modern Computer Security Solutions (Year: 2013).*

Petroni Jr., N. L. et al., "Copilot—A Coprocessor-based Kernel Runtime Integrity Monitor," (Research Paper), Aug. 9-13, 2004, USENIX Security Symposium, 16 pages. http://www.iesusmolina.com/publications/2004NPTE.pdf.

Microsoft, "BitLocker Drive Encryption Overview", available online at <https://docs.microsoft.com/en-us/previous-versions/windows/it-pro/windows-server-2008-R2-and-2008/cc732774 (v=ws.11)?redirectedfrom=MSDN>, Nov. 17, 2009, 9 pages.

Milan Broz, "Linux Unified Key Setup", available online at <https://web.archive.org/web/20180413043307/https7/gitlab.com/cryptsetup/cryptsetup/blob/master/README.md>,Apr. 13, 2018, 3 pages.

Trusted Computing Group, "Trusted Platform Module 2.0 Library specification", available online at <https://trustedcomputinggroup.org/resource/tpm-library-specification/>, Mar. 15, 2013, 9 pages.

* cited by examiner

SECURE DATA PROTECTION

BACKGROUND

Security processing refers to the protection of computing platforms, i.e., the hardware, software, and firmware of computing devices. Computing devices may include phones, tablets, laptops, desktops, servers, and the like, which have central processing units (CPUs) that perform general purpose computer processing. Additionally, such platforms may include firmware, which may operate the CPU and other hardware. The software of a computing platform may include the computing applications installed, e.g., the apps on a smartphone computing platform. Security processing thus may involve keeping hackers from taking control of any part of the computing platform. However, given the persistence of computer hacking efforts in our Wi-Fi-connected world, providing security for computing platforms may be challenging.

BRIEF DESCRIPTION OF THE DRAWINGS

The present disclosure may be understood from the following detailed description when read with the accompanying Figures. In accordance with the standard practice in the industry, various features are not drawn to scale. In fact, the dimensions of the various features may be arbitrarily increased or reduced for clarity of discussion.

Some examples of the present application are described with respect to the following figures.

DETAILED DESCRIPTION

A security co-processor is a computer chip that may perform cryptographic operations to protect computing platforms against computer hackers. One example of a security co-processor is the trusted platform module (TPM). The trusted platform module may securely store information for use when the computing platform is not compromised. Securely stored information may include passwords and encryption keys, for example. With a trusted platform module, if a hacker attempts to compromise a computing platform, access to the securely stored passwords and encryption keys may be denied. However, security co-processors such as the trusted platform module may provide such security by providing tools that are used by the firmware and software installed on the computing platform. Thus, if the security of such firmware and software is compromised, it may be possible for a hacker to access the information securely stored by the trusted platform module.

For example, one way to compromise the security of software is through a hack known as the downgrade attack. In the downgrade attack, the hacker may exploit firmware or software that has a known vulnerability in a previous version of the firmware or software. A vulnerability may be a security hole in the program code that can be used by the hacker to access secured data on a computing platform, such as a cryptographic key securely stored by a trusted platform module. In the computer industry, when such vulnerabilities are found, the affected software or firmware may be updated with new versions that keep hackers from taking advantage of the vulnerability. Thus, while a hacker may no longer be able to exploit the updated version, by downgrading the firmware or software to the previous version, the hacker may be able to exploit the vulnerability.

Accordingly, examples of the present disclosure provide a security feature that may tie a platform's state to the protection of information securely stored by a security co-processor. The platform state may represent characteristics of the computing platform such as the firmware and software that is running on the platform and their respective versions. Thus, if a hacker attempts to access a cryptographic key protected by the security co-processor using a downgrade attack, the security co-processor can detect the changed platform state and previous version to deny access to the cryptographic key.

Figure 1:
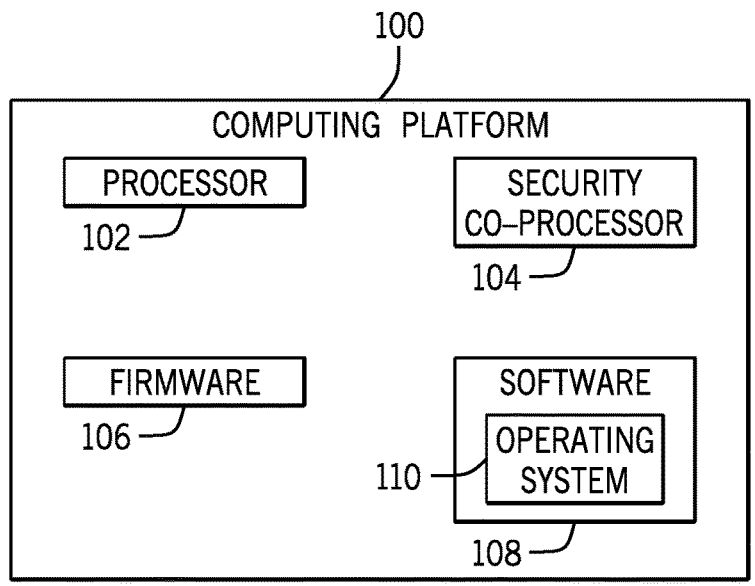
FIG. 1 is an example computing platform for security processing.

FIG. 1 is an example computing platform 100 for security processing. The computing platform 100 includes a processor 102, a security co-processor 104, firmware 106, and software 108. The processor 102 may be a general-purpose computer processor, such as a central processing unit (CPU). The security co-processor 104 may be a dedicated computer circuit for securing private data on the computing platform 100, such as the trusted platform module described above, a baseboard management controller, and the like. The security co-processor 104 may be any processing device or security chip that is trustworthy, provides software-tampering-proof storage, data sealing, knowledge of the platform state, and a flexible access control mechanism enforced by the security co-processor 104.

The computer programs that run on the computing platform 100 may include the firmware 106, and software 108. The firmware 106 is a specific class of computer software that provides the low-level control for the device's specific hardware. Firmware 106 is useful when the computing platform is booting because there is no operating system 110 yet. The firmware 106 thus makes it possible for the operating system 110 to load into memory so the processor 102 can run the instructions of the operating system 110, and begin operating the computing platform 100.

One example firmware 106 is the unified the unified extensible firmware interface (UEFI), which defines a software interface between an operating system 110 and the firmware 106 for the computing platform 100. The UEFI replaces the basic input/output system (BIOS) firmware interface originally used in personal computers. Most UEFI firmware implementations provide legacy support for BIOS services. However, being backward compatible presents challenges because downgrade attacks may be prevented by eliminating backward compatibility.

The software 108 may include the various computer programs running on the computing platform 100, from the computer applications used to run communication networks in large datacenters down to the apps on a smartphone and desktop applications on a personal computer. The operating system 110 is the software 108 that operates the computing platform 100, by loading software 108 into memory, scheduling the software instructions for execution on the processor 102 and operating the various components installed on the computing platform 100, such as disk drives and peripheral devices. Additionally, the operating system 110 may control upgrades to the firmware 106 and the software 108.

It may be useful for the software 108 on the computing platform 100 to use secret, or private, data. For example, the software 108 may include a driver computer application that operates a storage drive such as a hard drive on the computing platform 100. The operating system 110 may be encrypted on the hard drive to prevent hackers from corrupting it. As such, in order to read from and write to the volume on the hard drive containing the operating system 110, the driver computer application may use a secret, cryptographic key for encrypting and decrypting the operating system 110 instructions on the hard drive. The encryption key may be securely stored by the security co-processor 104. The computer drive application described herein is merely one example of software 108 that may run on the computing platform 100 and use secret data, such as cryptographic keys and passwords.

Knowing the state of the computing platform 100, e.g., the firmware 106 and operating system 110 running on the computing platform 100 may be useful because the platform state may provide some indication as to how secure the computing platform 100 is. For example, if the firmware 106 or the operating system 110 on the computing platform 100 changes, the software 108 may still run, but the computing platform 100 may not be secure. A change in the firmware 106 or operating system 110 may mean a hacker has made the change and may be able override the security provided on the computing platform 100, including the security co-processor 104. Accordingly, in examples, the security co-processor 104 may be used to tie the security of the private data of the firmware 106 and software 108 to a specific platform state, i.e., a known good state. An example known good state may be the original platform state provided by the manufacture of the computing platform 100. In examples, when the firmware 106 or software 108 requests the security co-processor 104 to securely store a cryptographic key, password, or other data, the firmware 106 or software 108 may specify a policy for accessing the secured data. The policy may indicate a specific combination of firmware 106 and operating system 110 that indicate a known good state. Thus, if the firmware 106 or software 108 attempts to retrieve the secured data through the security co-processor 104, the security co-processor 104 may withhold the secured data unless the platform state is in the known good state specified by the policy. An example of platform state policy is a policy that only authorizes a specific UEFI on the computing platform and mandates that a UEFI secured boot is enabled. Such a platform state policy may prevent a hacker from running a modified UEFI version, and makes sure that UEFI execute an operating system 110 that is signed by the original manufacturer of the computing platform 100, or the owner of the computing platform 100.

Additionally, in examples, the security co-processor 104 may be used to prevent against downgrade attacks using a version counter policy. More specifically, the security co-processor 104 may be used to store a version counter that may be verified before potentially downgraded firmware or software 108 is given access to their secured data. Thus, the security of secured data on the computing platform 100 may be tied not just to a specific firmware 106 and operating system 110, but specific versions of the firmware 106 and operating system 110 as well.

The security co-processor 104 may enforce a platform state policy, and a version counter policy by storing the platform state and version counter within the security co-processor 104. Access to a protected computer application, or data stored by the computer application, may be provided to requesting users when the actual platform state of the computing platform matches an expected platform state. Further, access may be restricted by comparing the actual version counter of the protected computer application to an expected version counter provided by the requesting user. A requesting user may be the protected computer application or, potentially, a computer application installed on the computing platform 100 by a hacker.

Figure 2:
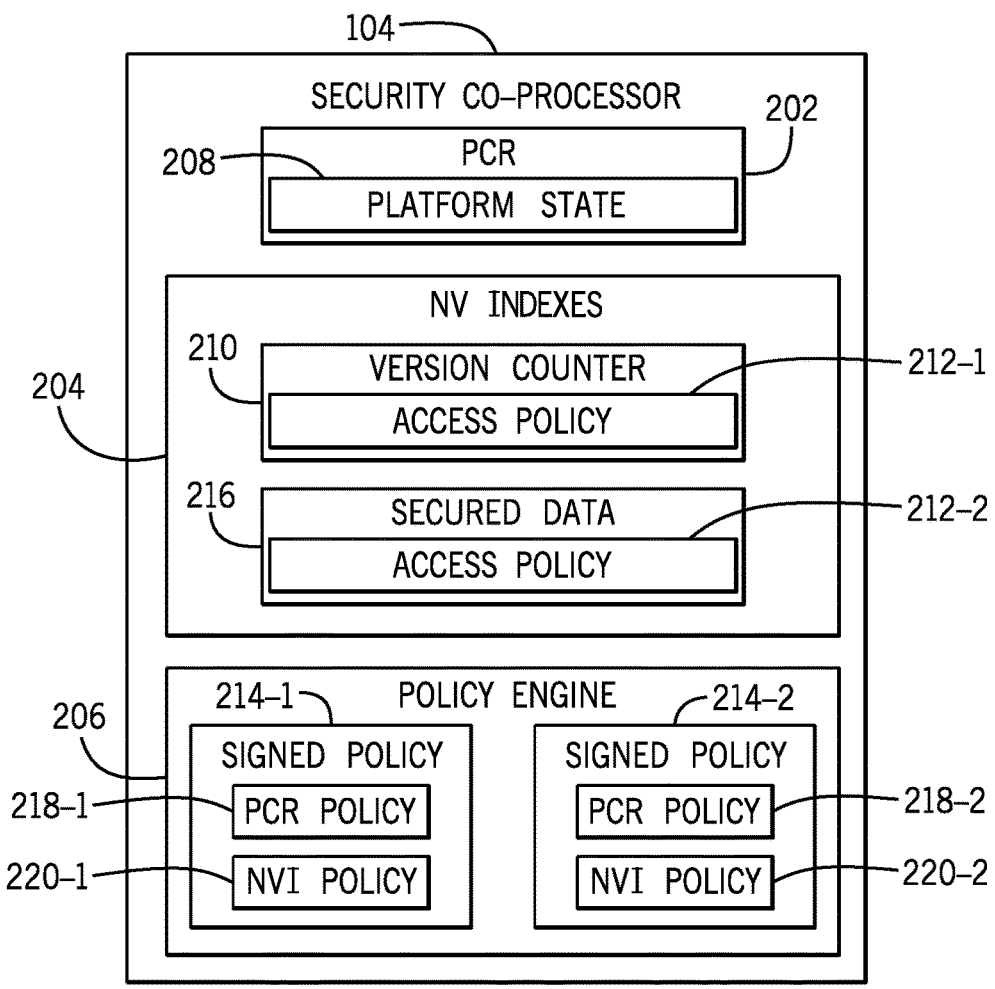
FIG. 2 is an example security co-processor for security processing.

FIG. 2 is an example security co-processor 104 for security processing. In examples, the security co-processor 104 may include a platform control register (PCR) 202, non-volatile (NV) indexes 204, and a policy engine 206. The PCR 202 may include a platform state 208, which may represent the measured platform state of the computing platform 100. The platform state 208 may be a value generated by reading the computer memory for the value of the binary of the firmware 106 and operating system 110, and hashing the value. The platform state 208 may be used to protect access to a version counter 210 and secured data 216 potentially stored in the NV indexes 204. The version counter 210 and secured data 216 may be protected according to access policies 212-1, 212-2. The secured data 216 may include an access policy 212-2, which may indicate the conditions for accessing the secured data 216. The access policy 212-2 may specify that the secured data 216 may not be accessed unless the value in the version counter 210 matches a value provided by a requesting user in a signed policy, such as signed policy 214-2. The signed policy 214-2 may be loaded into the policy engine 206, which enforces the access policy 212-2. Additionally, the access policy 212-2 may indicate that the secured data 216 may not be accessed unless the platform state 208 matches an expected platform state indicated in the signed policy 214-2. The signed policy 214-2 includes an expected platform state in a PCR policy 218-1, and a version counter in an NVI policy 220-2. Thus, if the platform state 208 and version counter 210 match the PCR policy 218-2 and the NVI policy 220-2, the requesting user may be authorized for access to the secured data 216. In order to ensure that a valid user is providing the signed key, the policy engine 206 may validate a signature (not shown) of the signed policy 214-2 against a public key stored in a signed policy 214-2. If the signature of the signed policy 214-2 is validated against the public key of the access policy 212-2, the policy engine 206 may grant access to the secured data.

Similarly, the version counter 210 may include an access policy 212-1, which may indicate the conditions for accessing the version counter 210. The access policy 212-1 may specify that the version counter 210 may not be updated unless the value in the version counter 210 matches a value provided by a requesting user in the signed policy 214-1. The signed policy 214-1 may be loaded into the policy engine 206, which enforces the access policy 212-1. Additionally, the access policy 212-1 may indicate that the version counter 210 may not be updated unless the platform state 208 matches an expected platform state indicated in the signed policy 214-1. Thus, if the platform state 208 and version counter 210 match the PCR policy 218-1 and the NVI policy 220-1, and the signature of the signed policy 214-1 is validated against the public key of the access policy 212-1, the policy engine 206 may grant access to the version counter 210. In examples, the same public key may be used for both signed policies 214-1, 214-2. Alternatively, the signed policies 214-1, 214-2 may include different public keys.

Thus, the technique for protecting the secured data 216 is similar to the technique for protecting the version counter 210 when the operating system 110 updates a protected computer application. However, the signed policy 214-2 is different from the signed policy 214-1 for 2 reasons: 1) the public keys may be different, and 2) the expected platform state and version counter values are different.

The access policies 212-1, 212-2 may be stored as metadata within the secured data 216 and version counter 210, respectively. Although the secured data 216 and version counter 210 are shown within the security co-processor 104, in examples, the secured data 216 and version counter 210 may be encrypted by the security co-processor 104 and stored in a memory device outside the security co-processer 104.

Figure 3:
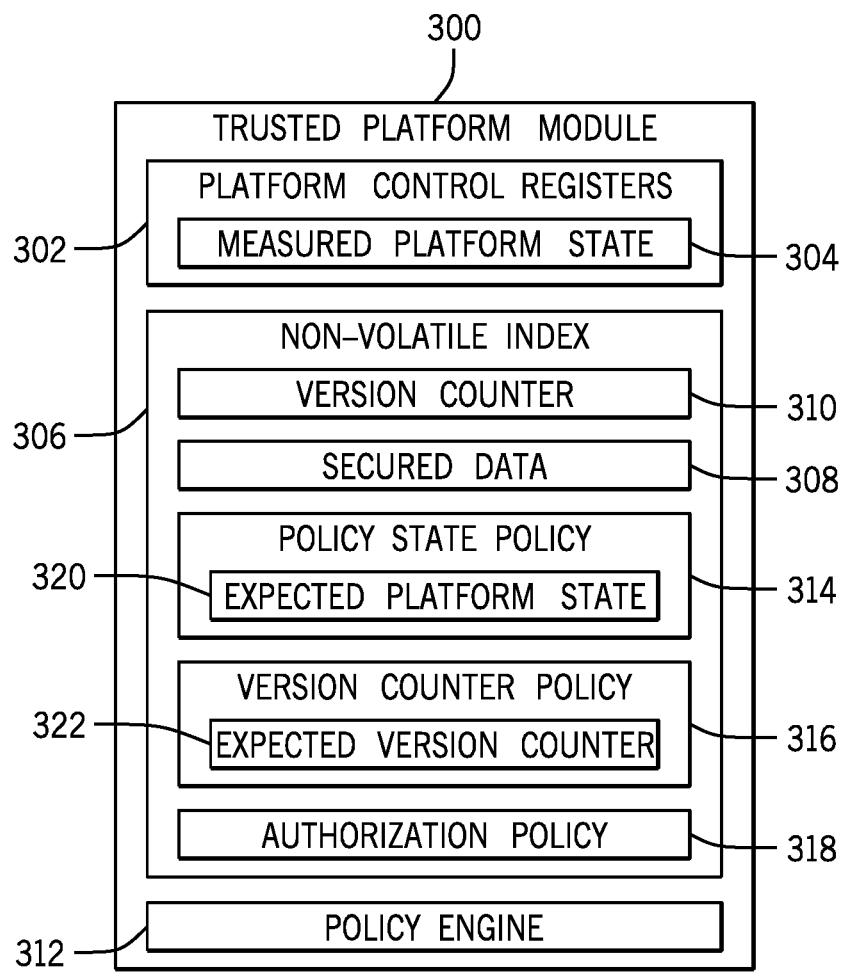
FIG. 3 is an example trusted platform module for security processing.

FIG. 3 is an example trusted platform module 300 for security processing. The trusted platform module 300 is an example of a security co-processor, such as the security co-processor 104. The trusted platform module 300 may be a computer chip that provides secure storage for data that may be used to secure a computing platform, such as the computing platform 100. The trusted platform module 300 may securely store information about the computing platform 100, such as details about how the computing platform 100 is booted, what firmware 106 and software 108 are loaded into the memory of the computing platform 100 and protect these details from modification. In some cases, the trusted platform module 300 may protect data by storing data within the trusted platform module 300 itself. In other cases, the trusted platform module 300 may store the data outside of the trusted platform module 300 but protect the data from access by encrypting the data with a cryptographic key that is securely stored within the trusted platform module 300. The trusted platform module 300 may be configured to operate based on a set of commands. Thus, firmware 106 or software 108 running on the computing platform 100 may use these commands to retrieve and store data that is secured by the trusted platform module 300.

The trusted platform module 300 may include platform configuration registers 302, a non-volatile index 306, and a policy engine 312. The platform configuration registers 302 may be computer memory that may store security-relevant data, such as the platform state. In examples, the platform state may be represented by a hash value of each individual component representing the platform, such as, binary files for the firmware 106 and binary files for the operating system 110. In examples, the platform state may also be represented by configuration files, which may specify parameters that the firmware 106 and operating system 110 use to operate the computing platform 100. The hash value may be a unique value obtained by executing a hash function over the machine code of what the hash value represents, e.g., the UEFI binary code, the operating system 110 binary code, the configuration files, etc.

In examples, when the computing platform 100 is booted, the firmware 106 may store a measured platform state 304 in the platform configuration registers 302. The measured platform state 304 may be a hash value that identifies the firmware 106 itself, the operating system 110 running on the computing platform 100, and/or configuration files. The trusted platform module 300 may protect the platform configuration registers 302 from updates. Additionally, resets of the platform configuration registers 302 may be restricted to reboots of the computing platform 100, thus ensuring that the measured platform state 304 stored during the boot operation is an accurate representation of the firmware 106, operating system 110, and configuration files on the computing platform 100. In this way, the trusted platform module 300 may be configured to store the measured platform state 304 in the platform configuration registers 302 before the firmware 106 and operating system 110 begin running. Thus, if the firmware 106 or operating system 110 are modified in a hacking attempt, these features of the platform configuration registers 302 may be stored in the platform configuration registers 302 to prevent hackers from hiding such modifications.

In examples, the individual hash values may be stored in separate platform configuration registers 302, e.g., platform configuration registers 302 for UEFI-related platform states and platform configuration registers 302 for operating system-related platform states. Alternatively, each platform configuration register 302 may contain the platform state information of multiple components through a mechanism called platform configuration register extension. With the platform configuration register extension, the value of a platform configuration register 302 may be a hash of a previous value of the platform configuration register 302 that is concatenated with a new platform state.

The non-volatile index 306 may be computer memory that holds secured data 308, version counter 310, a platform configuration register (PCR) policy 314, a non-volatile index (NVI) policy 316, and an authorization policy 318. In some examples, the non-volatile index 306 is configured to be permanent and indestructible unless a factory reset of the trusted platform module 300 occurs. In this example, a factory reset can be implemented as a dedicated command by a security co-processor, such as the trusted platform module 300.

The secured data 308 may be the data to be secured by the trusted platform module 300, and may include passwords, cryptographic keys, and the like. In examples, firmware 106 or software 108 may make a request to the trusted platform module 300 to store the secured data 308. In some scenarios, the secured data 308 may not be stored in the non-volatile index 306, but instead be stored outside the trusted platform module 300. In such scenarios, the secured data 308 may be encrypted with a trusted platform module key (not shown) before storing the secured data 308 outside the trusted platform module 300.

The version counter 310 may include a value that represents a current version of the platform state. The version counter 310 may represent the combination of the firmware 106, the operating system 110, and configuration files, for example. Alternatively, the trusted platform module 300 may include separate version counters 310 for each of the firmware 106, operating system 110, configuration files, etc. The version counter 310 may be represented as a hash value of the firmware 106, an integer counter (e.g., 1, 3, 4, etc.), a string version of an integer counter (e.g., one, two, three, etc.), and the like.

When the secured data 308 is first stored by the trusted platform module 300, the firmware 106 or software 108 requesting that the secured data 308 be secured, may provide signed policies 314, 316, 318, which the policy engine 312 uses to protect the secured data 308 from unauthorized release. The policies 314, 316, 318 may be stored in metadata of the non-volatile index 306. Alternatively, the policies may be stored with the secured data 308 if the secured data 308 is stored outside the trusted platform module 300. The PCR policy 314 may be created with an expected platform state 320. The expected platform state 320 may be a hash value of the firmware 106, operating system 110, and/or configuration files, for example. The PCR policy 314 may indicate that the secured data 308 may be released if the measured platform state 304 matches the expected platform state 320. The expected platform state 320 may be determined by the manufacturer of the computing platform 100. Manufacturers of computing platforms 100 typically install the firmware 106 and operating system 110 before sale. Thus, these manufacturers may be able to predict the expected platform state 320, which may then be used to prevent unauthorized access to the secured data 308.

Further, the NVI policy 316 may be created with an expected version counter 322. The NVI policy 316 may indicate that the secured data 308 may be released if the expected version counter 322 matches the value in the version counter 310. In examples, the PCR policy 314 and NVI policy 316 may be combined to act as a single policy, with one signature. In this way, the PCR policy 314 and the NVI policy 316 may be combined to protect the secured data 308 from a downgrade attack. The expected platform state 320 and expected version counter 322 may represent the known good state of the computing platform 100, under which the secured data 308 may be released. Accordingly, in addition to being stored when the PCR policy 314 and the NVI policy 316 are created, the expected platform state 320 and expected version counter 322 may also be updated when the platform state and versions of the firmware 106, software 108, and/or configuration files are updated by an authorized user of the computing platform 100.

In examples, the PCR policy 314 and the NVI policy 316 may not be stored in the non-volatile index 306. Instead, the access policies may be stored as part of the metadata for the version counter 310 and the secured data 308. However, an implementation may use the non-volatile index 306 for storing policies 314, 316. In such an implementation, the policies 314, 316 may be read from the non-volatile index 306 and input to the policy engine 312.

Thus, when a requester makes a request for the secured data 308, the policy engine 312 may enforce policies 314, 316, 318 before releasing the secured data 308 to the requester. Thus, in addition to enforcing the PCR policy 314 and the NVI policy 316 as described above, the policy engine 312 may also verify that the requester is authorized by the authorization policy 314. In examples, the requester provides a signed policy when requesting the secured data 308. The signed policy provided may be signed using a private key. Thus, the policy engine 312 may verify the signature using the public key in the authorization policy. If the verification is successful, the requester may be authorized to access the secured data 308.

Because the version counter 310 may be used to protect the computing platform 100 from downgrade attacks, the version counter 310 may be protected from unauthorized access and updates similar to how the secured data 308 is protected. As such, the trusted platform module 300 may include a PCR policy 314 and authorization policy 318 that the policy engine 312 may use to protect the version counter 310 from unauthorized access or updates.

When protected firmware 106 or software 108 is updated, the version counter 310 is updated. In examples, after the protected firmware 106 or software 108 is updated, the computing platform 100 may be re-booted. In such examples, the version counter 310 may be updated after the re-boot. In order to update the version counter 310, the firmware 106 or software 108 being updated presents a signed policy which contains a PCR policy 314 and an NVI policy 316 that references the version counter 310. The self-referencing in the NVI policy 316 is used to ensure that the version counter 310 is updated correctly.

As stated previously, the trusted platform module 300 is one example of the security co-processor 104 described with respect to FIG. 1. Other examples of the security co-processor 104 may not include all the features of the trusted platform module 300, or additional features.

Figure 4:
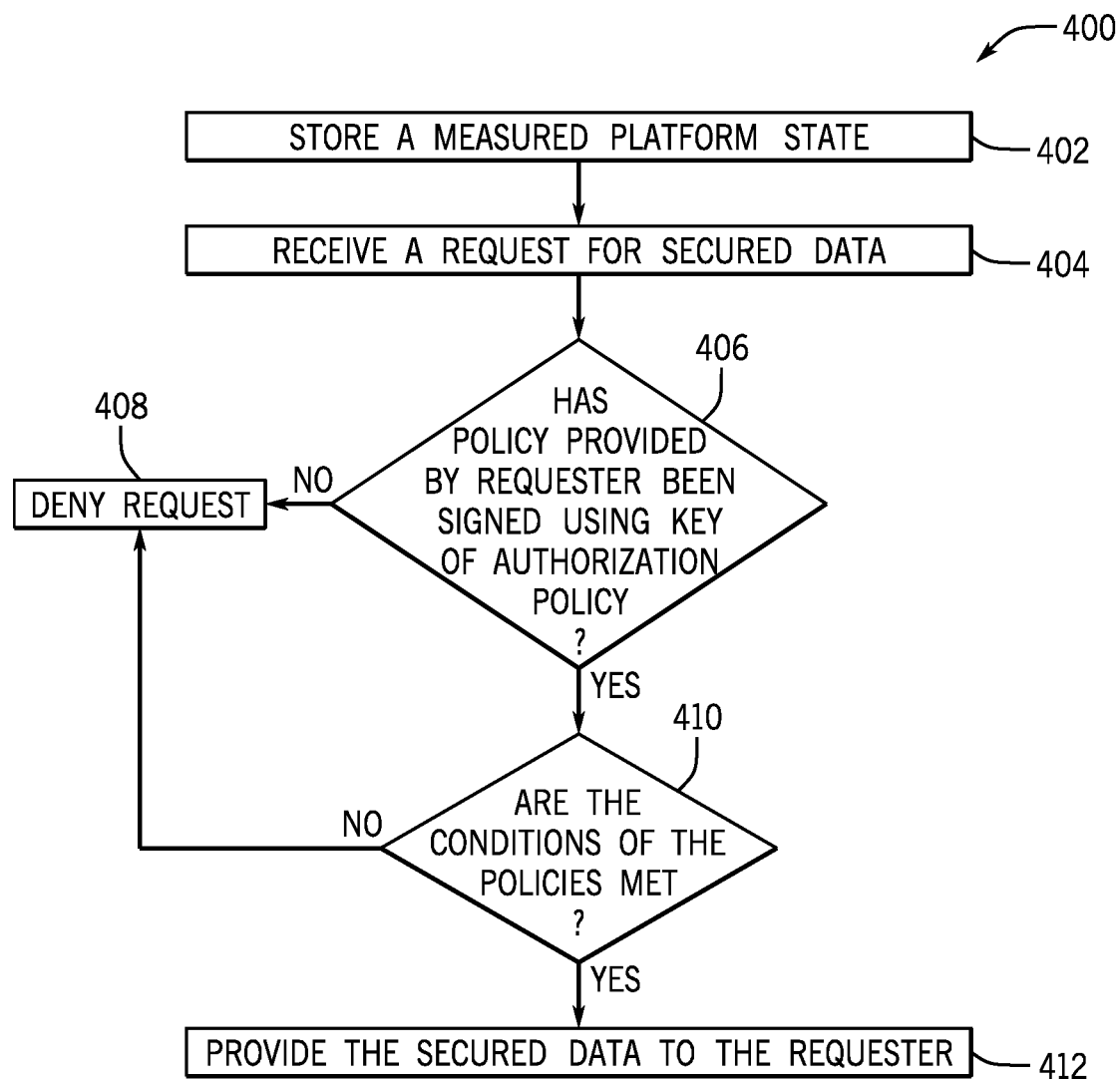
FIG. 4 is an example method for security processing.

FIG. 4 is an example method 400 for security processing. The method 400 may be performed by firmware or software running on a computing platform, such as the firmware 106 and software 108 running on the computing platform 100. At block 402, the firmware 106 may store a measured platform state, such as the measured platform state 304 in platform configuration registers, such as the platform configuration registers 302. The measured platform state 304 may be a hash value that represents the binary version of the firmware 106 and operating system 110 running on the computing platform 100. The hash value may be generated using a hash function on the binary files of the firmware 106, operating system 110, and/or configuration files. The measured platform state 304 may be determined during a boot operation of the computing platform 100.

At block 404, a security co-processor, such as the trusted platform module 300 may receive a request for secured data, such as the secured data 308. For example, software 108 for reading a self-encrypted hard drive may request the cryptographic key for decrypting the data stored on such a hard drive. The request for the secured data 308 may include a signed policy with a private key.

At block 406, the trusted platform module 300 may determine whether the signed policy provided by the requester has been signed using a private key that corresponds to the public key stored in the authorization policy 318. If the signed policy provided by the requester has not been signed using the public key stored in the authorization policy 318, at block 408, the request for the secured data 308 may be denied.

However, if the signed policy provided by the requester has been signed using the public key stored in the authorization policy 318, at block 410, the trusted platform module 300 may determine whether the conditions of the policies are met. If not, control may flow to block 408, where the request for the secured data 308 may be denied. However, if the conditions of the policies are met, at block 412, the secured data 308 may be released. For example, if the expected platform state 320 of the PCR policy 314 matches the measured platform state 304 of the platform configuration registers, and the expected version counter 322 matches the version counter 310, the secured data 308 may be released.

Because the version counter 310 may be used to protect the computing platform 100 against the downgrade attack, it is useful to protect the version counter 310 from unauthorized updates similar to how the secured data 308 is protected from unauthorized access. As such, a method is described with respect to FIG. 5 for modifying the version counter 310.

Figure 5:
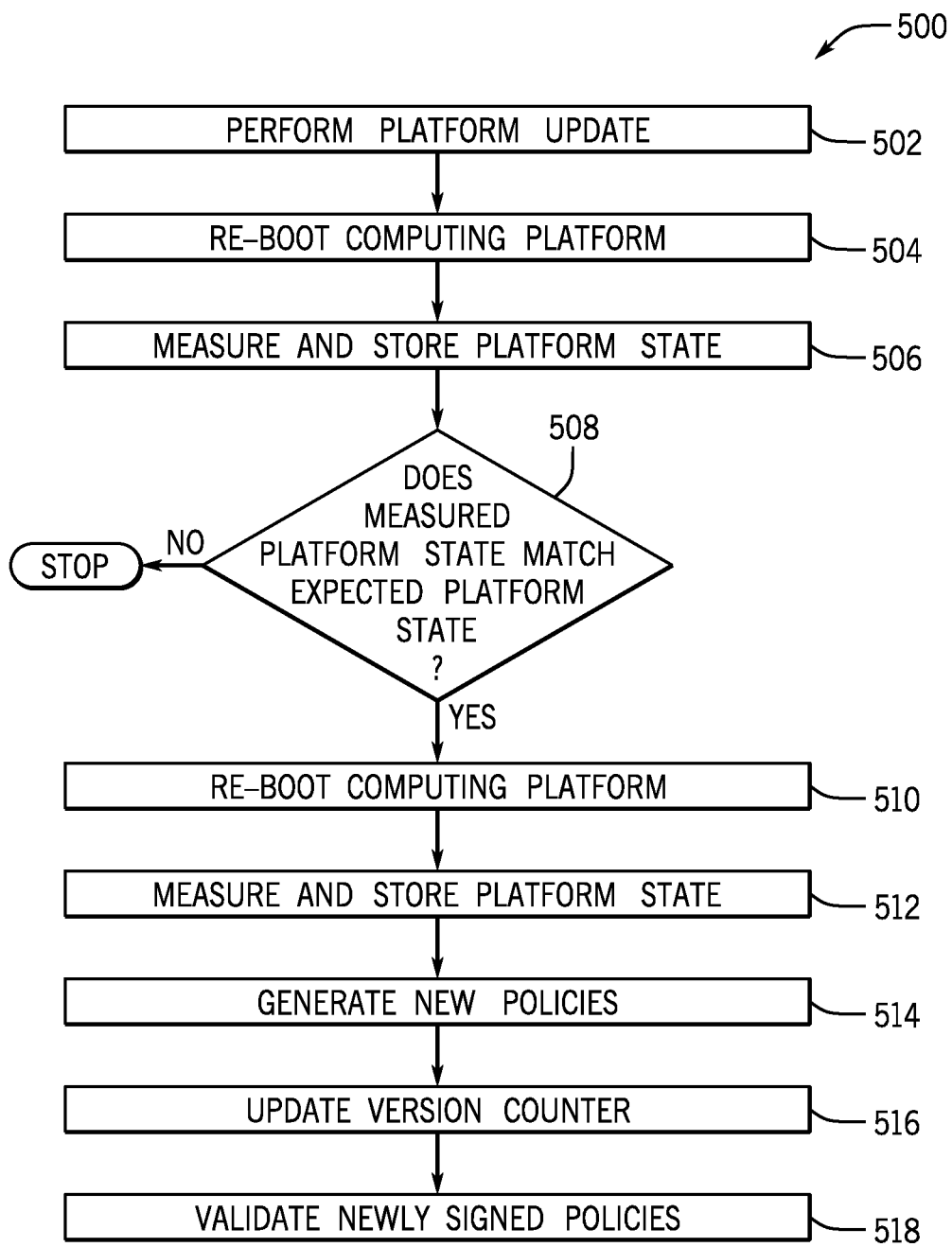
FIG. 5 is an example method for security processing.

FIG. 5 is an example method 500 for security processing. The method 500 may be performed by the operating system 110. At block 502, a platform update may be performed. For example, the platform update may be an update to the firmware 106 of the computing platform 100. Additionally, the platform update may include replacing the boot files of the updated firmware 106, for example. The boot files may be the files run during the boot operation to execute the new version of the firmware 106. In examples, the old boot files may be backed up in case the update to the firmware 106 fails.

As stated previously, in addition to the PCR policy 314 used to protect the secured data 308, there is an additional PCR policy 314 to protect the version counter 310. The additional PCR policy 314 may be created by the manufacturer of the firmware 106 or software 108 when the new version is made available. The signed policy for updating the version counter is made up of a PCR policy 314 that references a new expected platform state 320 after the update, and the previous value of the version counter 310 before the update. The previous value of the version counter 310 may be represented in the NVI policy 316. Accordingly, the platform update may involve updating the expected platform state 320 of the additional PCR policy 314 based on the updated version of the firmware 106.

At block 504, the computing platform 100 may be re-booted. Re-booting means that all the firmware 106 and software 108 running on the computing platform 100 are terminated normally, and the computing platform 100 is re-started.

At block 506, the platform state may be measured and stored in the platform configuration registers 302. As stated previously, the platform state may be measured during the re-boot operation. Measuring the platform state means that the binary versions of the firmware 106 and operating system 110 may be hashed to generate values that may uniquely identify the firmware 106 and operating system 110. The measured platform state 304 may thus be stored in the platform configuration registers 302.

At block 508, the measured platform state 304 may be compared to the expected platform state 320. If the update to the firmware 106 is a legitimate update, the measured platform state 304 matches the expected platform state 320. If the measured platform state 304 does not match the expected platform state 320, the platform update may have failed. Accordingly, the operating system 110 may terminate the method 500, and re-install the previous version of the firmware 106.

If the measured platform state 304 does match the expected platform state 320, at block 510, the computing platform 100 is re-booted. The computing platform 100 is re-booted so that the version counter 310 may be updated.

At block 512, the platform state is again measured and stored in the platform configuration registers 302. At block 514, the policies 314, 316, 318 may be replaced with newly signed policies 314, 316, 318 that are generated by the manufacturer of the computing platform 100, which may be providing the updated firmware 106. The new PCR policy 314 includes a new expected platform state 320 to match the new platform state. The new NVI policy 316 includes the new version number of the updated firmware 106.

At block 516, the version counter 310 may be updated. The version counter 310 may be updated with a new version number that represents the updated version of the firmware 106. In order to update the version counter 310, the user, firmware 106, or software 108 invoking the update may provide a signed policy that the policy engine 312 may verify against the authorization policy 318 for the version counter 310. The new value of the version counter 310 may depend on the format used. The new value may be either the current value incremented by one, a hash of the new version, a string of the new version, and the like.

At block 518, the operating system 110 may validate the newly signed policies. Validating the newly signed policies means ensuring that the expected platform states 320 represented in the newly signed policies match the measured platform state 304. If the measured platform state 304 does not match the expected platform state 320, and the version counter 310 does not match the expected version counter 322, access to the secured data 308 is not granted. Additionally, the signed policy can also have additional policies such as a back-up policy to the PCR policy 314 and NVI policy 316. In such a case, the back-up policy may verify if the requester enters a given password so that in case of failure of the PCR+NVI part of the policy, access to the secured data 308 may still be provided.

It is to be understood that the process flow diagram of FIG. 5 is not intended to indicate that the method 500 is to include all of the blocks shown in FIG. 5 in every case. Further, any number of additional blocks can be included within the method 500, depending on the details of the specific implementation. In addition, it is to be understood that the process flow diagram of FIG. 5 is not intended to indicate that the method 500 is only to proceed in the order indicated by the blocks shown in FIG. 5 in every case. For example, block 504 can be rearranged to occur before block 502.

Figure 6:
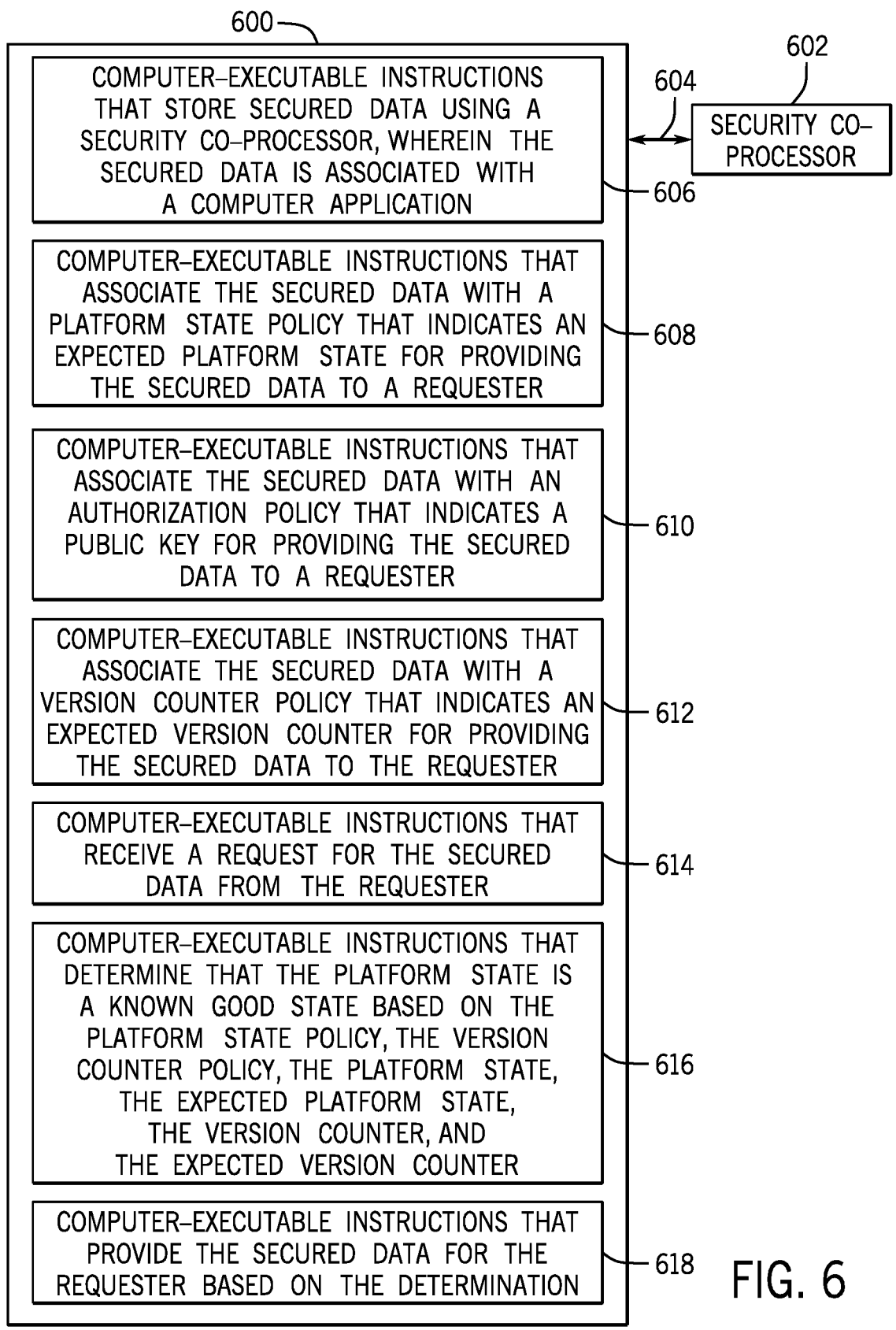
FIG. 6 is an example tangible, non-transitory computer-readable medium that stores code for security processing.

FIG. 6 is an example tangible, non-transitory computer-readable medium that stores code for security processing. The tangible, non-transitory computer-readable medium is generally referred to by the reference number 600. The tangible, non-transitory computer-readable medium 600 may correspond to any typical computer memory that stores computer-implemented instructions, such as programming code or the like. For example, the tangible, non-transitory computer-readable medium 600 may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The tangible, non-transitory computer-readable medium 600 can be accessed by a security co-processor 602 over a computer bus 604. The security co-processor 602 can be implemented as a controller that is separate from a central processing unit that is to execute an operating system in the system that the security co-processor 602 is implemented on. Examples of the security co-processor include a TPM and a baseboard management controller. A region 606 of the tangible, non-transitory computer-readable medium stores computer-executable instructions that store secured data using a security co-processor, wherein the secured data is associated with a computer application. A region 608 of the tangible, non-transitory computer-readable medium stores computer-executable instructions that associate the secured data with a platform state policy that indicates an expected platform state for providing the secured data to a requester. A region 610 of the tangible, non-transitory computer-readable medium stores computer-executable instructions that associate the secured data with an authorization policy that indicates a public key for providing the secured data to a requester. A region 612 of the tangible, non-transitory computer-readable medium stores computer-executable instructions that associate the secured data with a version counter policy that indicates an expected version counter for providing the secured data to the requester. A region 614 of the tangible, non-transitory computer-readable medium stores computer-executable instructions that receive a request for the secured data from the requester. A region 616 of the tangible, non-transitory computer-readable medium stores computer-executable instructions that determine that the platform state is a known good state based on the platform state policy, the version counter policy, the platform state, the expected platform state, the version counter, the expected version counter, and the authorization policy. A region 618 of the tangible, non-transitory computer-readable medium stores computer-executable instructions that provide the secured data for the requester based on the determination.

Although shown as contiguous blocks, the software components can be stored in any order or configuration. For example, if the tangible, non-transitory computer-readable medium 600 is a hard drive, the software components can be stored in non-contiguous, or even overlapping, sectors.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for secure data protection, comprising:
   storing secured data using a security co-processor of a computing platform, wherein the secured data is associated with a computer application;
   associating the secured data with a platform state policy that indicates an expected platform state for providing the secured data to a requester;
   associating the secured data with a version counter policy that indicates an expected version counter for providing the secured data to the requester;
   receiving a request for the secured data from the requester;
   in response to the request, the security co-processor determining whether a measured platform state stored in the security co-processor is a known good state based on the platform state policy, the version counter policy, the measured platform state, the expected platform state, a version counter, and the expected version counter, wherein the version counter represents a current version of the measured platform state;
   updating the version counter responsive to firmware or software on the computing platform being updated; and
   providing the secured data for the requester based on the determining whether the measured platform state is a known good state.

2. The method of claim 1, further comprising:
   storing the measured platform state in the security co-processor in response to a booting operation of the computing platform.

3. The method of claim 1, wherein the measured platform state comprises a representation of an operating system that is running on the computing platform.

4. The method of claim 1, wherein the computer application comprises an operating system.

5. The method of claim 1, wherein the measured platform state comprises a representation of the firmware.

6. The method of claim 5, wherein the computer application comprises the firmware.

7. The method of claim 1, further comprising:
   updating the computer application to a new version of the computer application;
   generating a new platform state policy to indicate a new expected platform state for providing the secured data to the requester in response to determining that the computer application is updated successfully, wherein the new expected platform state is based on the updated computer application;
   rebooting the computing platform;
   determining whether a measured platform state of the rebooted computing platform represents the updated computer application; and
   updating the version counter based on the determining whether the measured platform state of the rebooted computing platform represents the updated computer application.

8. A system, comprising:
   a security co-processor; and
   a memory device that stores instructions that cause the security co-processor to:
      store secured data using a security co-processor, wherein the secured data is associated with a computer application;
      associate the secured data with a platform state policy that indicates an expected platform state for providing the secured data to a requester;
      associate the secured data with a version counter policy that indicates an expected version counter for providing the secured data to the requester;
      receive a request for the secured data from the requester;
      in response to the request, determine whether a measured platform state is a known good state based on the platform state policy, the version counter policy, the measured platform state, the expected platform state, a version counter, and the expected version counter, wherein the version counter represents a current version of the measured platform state;
      update the version counter responsive to firmware or software on the system being updated; and
      provide the secured data for the requester based on the determination of whether the measured platform state is a known good state.

9. The system of claim 8, wherein the instructions further cause the security co-processor to:
   store the measured platform state in the security co-processor in response to a booting operation of the system.

10. The system of claim 8, wherein the measured platform state comprises a representation of an operating system that is running on the system.

11. The system of claim 8, wherein the computer application comprises the operating system.

12. The system of claim 8, wherein the measured platform state comprises a representation of the firmware.

13. The system of claim 12, wherein the computer application comprises the firmware.

14. The system of claim 8, wherein the instructions further cause the security co-processor to:
   update the computer application to a new version of the computer application; and
   generate a new platform state policy to indicate a new expected platform state for providing the secured data to the requester in response to determining that the computer application is updated successfully.

15. A non-transitory, computer-readable medium storing computer-executable instructions, which when executed, cause a computer to:

store secured data using a security co-processor, wherein the secured data is associated with a computer application;
associate the secured data with a platform state policy that indicates an expected platform state for providing the secured data to a requester;
associate the secured data with a version counter policy that indicates an expected version counter for providing the secured data to the requester;
store a measured platform state of a computing platform in the security co-processor in response to a booting operation of the computing platform;
store a version counter of the measured platform state in the security co-processor in response to installing a version of software associated with the platform state on the computing platform;
receive a request for the secured data from the requester;
use the security co-processor, in response to the request, to determine whether the measured platform state is a known good state based on the platform state policy, the version counter policy, the measured platform state, the expected platform state, the version counter, and the expected version counter, wherein the version counter represents a current version of the measured platform state;
update the version counter responsive to firmware on the computing platform or the software being updated; and
provide the secured data for the requester based on the determination of whether the measured platform state is a known good state.

16. The non-transitory, computer-readable medium of claim 15, wherein the measured platform state comprises a representation of an operating system that is running on the computing platform.

17. The non-transitory, computer-readable medium of claim 16, wherein the computer application comprises the operating system.

18. The non-transitory, computer-readable medium of claim 15, wherein the measured platform state comprises a representation of the firmware.

19. The non-transitory, computer-readable medium of claim 18, wherein the computer application comprises the firmware.

20. The non-transitory, computer-readable medium of claim 15, wherein the computer-executable instructions, when executed, further cause the computer to:
update the computer application to a new version of the computer application; and
generate a new platform state policy to indicate a new expected platform state for providing the secured data to the requester in response to determining that the computer application is updated successfully.

* * * * *